United States Patent [19]
Ishii

[11] Patent Number: 5,675,486
[45] Date of Patent: Oct. 7, 1997

[54] ELECTRIC POWER CIRCUIT HAVING MEANS FOR SUPPRESSING GENERATION OF HARMONICS FLOWING BACK TO AC POWER SOURCE

[75] Inventor: Kazuo Ishii, Tokyo, Japan

[73] Assignee: Jelmax Co., Ltd., Tokyo, Japan

[21] Appl. No.: 556,043

[22] Filed: Nov. 13, 1995

[30] Foreign Application Priority Data

Jan. 30, 1995 [JP] Japan .................................. 7-031802

[51] Int. Cl.$^6$ ........................................... H02H 3/16
[52] U.S. Cl. ................................................. 363/126
[58] Field of Search .................................. 361/58, 55, 54, 361/105–106, 93, 95, 98, 57; 323/21, 9, 11; 363/126; 315/119–120, 64–69, 129–134

[56] References Cited

U.S. PATENT DOCUMENTS

| | | |
|---|---|---|
| 3,935,511 | 1/1976 | Boulanger et al. .................... 317/20 |
| 4,100,586 | 7/1978 | Cronin ................................... 361/58 |

*Primary Examiner*—Aditya Krishnan
*Attorney, Agent, or Firm*—Hopgood, Calimafde, Kalil & Judlowe

[57] ABSTRACT

An electric power circuit for producing a DC output from an AC output of an AC power source comprises a rectifying circuit to be connected to the AC power source for rectifying the AC output to produce a rectified output, and a smoothing circuit comprising an electrolytic capacitor connected to the rectifying circuit and having an output port to be connected to a load, for smoothing the rectified output to produce a smoothed output as the DC output onto the output port. The DC output is supplied to the load connected to the output port so that a load current flows from the power circuit through the load. In order to reduce harmonic components flowing back to the AC power source due to ripple component included in the load current, a non-linear resistance element having a positive temperature coefficient of resistance is used in a positive one of connection lines connecting the rectifying circuit and the smoothing circuit. Examples of the non-linear resistance element are a tungsten lamp of a vacuum bulb type and of an inert-gas containing bulb type, and a thermistor having a positive temperature coefficient of resistance.

6 Claims, 6 Drawing Sheets

ELECTRIC POWER CIRCUIT HAVING MEANS FOR SUPPRESSING GENERATION OF HARMONICS FLOWING BACK TO AC POWER SOURCE

BACKGROUND OF THE INVENTION

The present invention relates to an electric power circuit for producing a DC output from an AC output of an AC power source and, in particular, to such a power circuit having effectively suppressing disadvantageous harmonics flowing back to the AC power source to thereby meet the International Standards by IEC (International Electrotechnical Commission) of 1000-3-2 against the harmonics in the power circuit.

In the prior art, the power circuit comprises a rectifying circuit to be connected to an AC power source for rectifying the AC output to produce a rectified output, a smoothing circuit connected to the rectifying circuit and having an output port to be connected to a load, for smoothing the rectified output to produce a smoothed output as the DC output onto the output port. The DC output is supplied to the load connected to the output port so that a load current flows from the power circuit through the load. The smoothing circuit usually comprises an electrolytic capacitor.

The power circuit of a type as described above is widely used in various electric and electronic apparatus, such as computers, television sets, ballast devices for lighting apparatus, air conditioners, and others. In particular, the power circuit is unexceptionally used in a primary circuit in a DC power supply of a switching type which is widely used in various information equipments.

The known power circuit has revealed to widely change in the power factor depending on kinds of the load and generates harmonic components of a frequency of the AC power source. The harmonic components, in turn, flow back to the AC power source to thereby make serious damages in power distributing wire system. This problem has brought about effectuation of the International Standards for regulating harmonic components of odd number orders such as the third, fifth, seventh, harmonics and so on which are especially disadvantageous.

Although various measures have been approached to suppress the harmonics since the effectuation of the International Standards, no useful measure has been proved to be complete. For example, using choke coil causes various problems such as heavy weight, noises, and magnetic flux leakage. It also causes generation of pulses at on/off times of switching elements in the DC power supply of a switching type as a load for the power circuit. Electronic circuits have been used for the approach but have been complex in circuit formation and expensive. Further, although it has been tried to lower the capacitance of the electrolytic capacitor for the smoothing circuit, it disadvantageously increases ripple noise in the DC output.

SUMMARY OF THE INVENTION

It is an object of the present invention to provide a power circuit for producing a DC output from an AC power source which enables to effectively suppress the harmonic components flowing back to the DC power source thereby to meet the International Standards.

It is another object to provide such a power circuit which is simple in circuit formation and easy in assembling.

The present invention is applicable to an electric power circuit which comprises a rectifying circuit to be connected to an AC power source for rectifying the AC output to produce a rectified output, a smoothing circuit connected to the rectifying circuit and having an output port to be connected to a load, for smoothing the rectified output to produce a smoothed output as the DC output onto the output port. The DC output is supplied to the load connected to the output port so that a load current flows from the power circuit through the load. The smoothing circuit comprises an electrolytic capacitor. According to the present invention, the rectifying circuit and the smoothing circuit are connected through a non-linear resistance element having a positive temperature coefficient of resistance, so that generation of the harmonics is suppressed.

The rectifying circuit has a positive terminal and a negative terminal and the smoothing circuit is connected across the positive terminal and the negative terminal through a positive connection line and a negative connection line, respectively. The positive connection line has the non-linear resistance element connected in series therein.

The non-linear resistance element may be a tungsten lamp of a vacuum type or an inert-gas containing type.

The non-linear resistance element may be a thermistor having a positive temperature coefficient of resistance.

DESCRIPTION OF THE PREFERRED EMBODIMENTS

Before preferred embodiments are described, a power circuit known in the prior art is explained with reference to the drawings.

Figure 1:
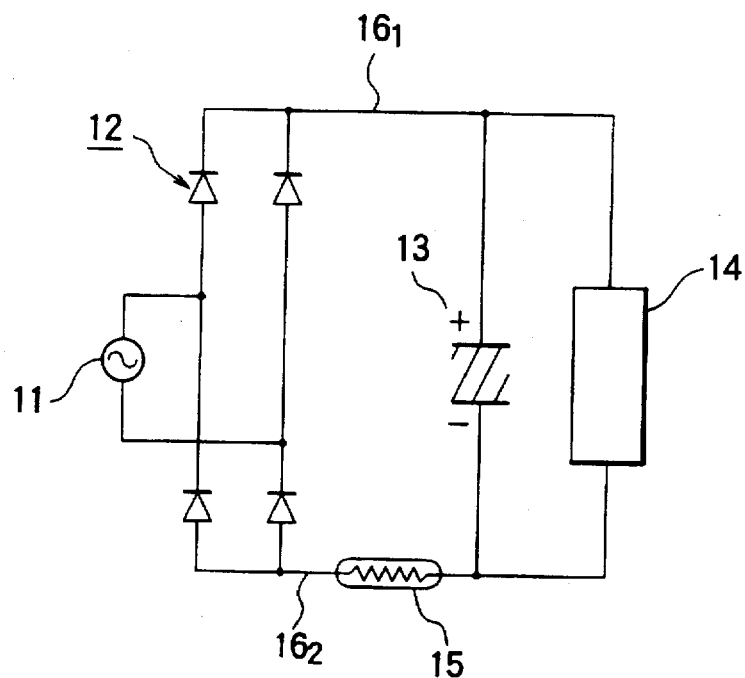
FIG. 1 is a circuit diagram showing a known power circuit.

Referring to FIG. 1, in the power circuit shown therein, an AC power of, for example, 100V, 50Hz is supplied from the commercial AC power source 11 to a bridge type rectifying circuit 12 and is rectified to produce a rectified output that is a pulsating current. The rectified current is smoothed by a smoothing circuit comprising an electrolytic capacitor 13 to produce a DC output. The DC output is supplied through an output port to a load 14 which is, for example, DC/DC converter. The rectifier circuit 12 and the smoothing electrolytic capacitor 13 are connected by a positive side connection line 16-1 and a negative side connection line 16-2 which has an NTC thermistor 15 of a negative temperature coefficient (NTC) of resistance therein to protect the rectifiers of the rectifying circuit 12 and the electrolytic capacitor 13 from a surge current.

When the load 14 is a pure resistor, the power factor of the power circuit is nearly equal to and there is no harmonics of odd number orders, such as 150Hz, 350Hz, 450Hz, and so on.

However, the power factor decreases when the load current includes any AC component of a relatively high frequency superposed on the DC current. For example, the power factor is about 0.9 in the power circuit used in the air conditioner of an inverter type, although the load current from the power circuit is large and includes the AC component of several hundreds Hertz such as 200–400 Hz. On the other hand, the power factor is 0.6 in the power circuit used in the switching power supply wherein the load current includes the AC component of a high frequency such as 100kHz.

Figure 3:
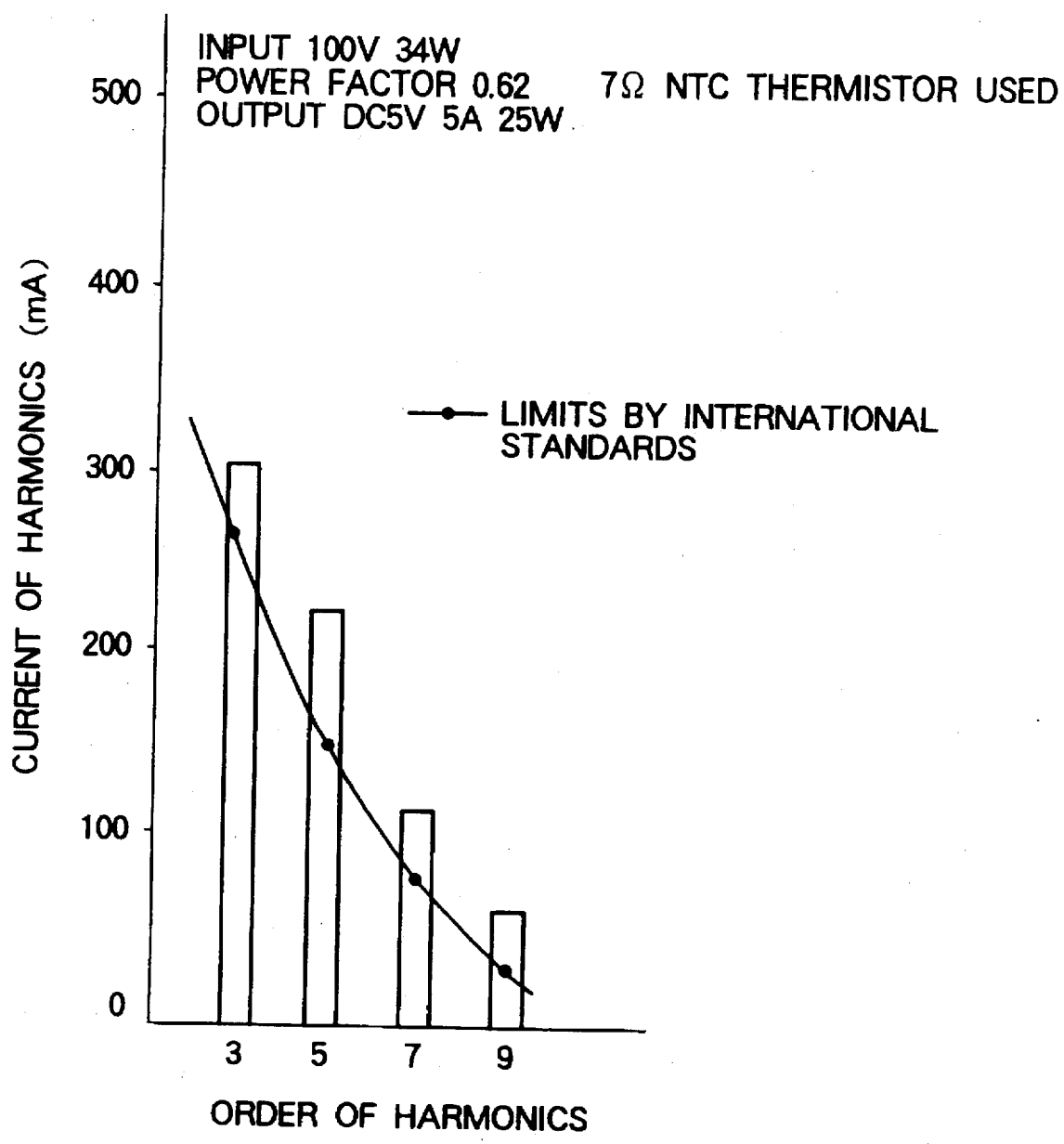
FIG. 3 is a graph showing harmonics generated in the known power circuit used in the switching power supply.

FIG. 3 shows current values to orders of harmonics measured in the known power circuit of FIG. 1 used in the switching power supply having a DC output of 5V, 5A and 25W, during operation by the input power of 34W/100V under a full load condition. The harmonic current were measured by use of a harmonic meter commercially available as a trade name of "FLUKE 40" together with a current transformer of a trade name of "CT101A". In FIG. 3, a curved line indicates the limits according to the International Standards by the IEC. It will be seen that the current of harmonics of all odd orders are greater than the limits of the International Standards. It was also confirmed that the power factor was 0.62.

Generally speaking, it is impossible to clear the limits of the harmonic generation in the International Standards by the IEC, if the power factor is lower than 0.7. The reason is not clear but can be considered that the usual smoothing electrolytic capacitor of 220 µF deteriorates in its function when the superposed AC component has a frequency closer to a resonance frequency of 150kHz of the capacitor, to thereby increase the harmonic ripples in the capacitors.

According to the present inventor's novel knowledge that a tungsten lamp has a considerable suppression ability of harmonics superposed on DC current, the present inventor made this invention so as to suppress the harmonics in the power circuit.

An experiment was carried out using an inert-gas containing tungsten lamp of 150W/100V. The lamp has a resistance of 6 ohms at the room temperature but an increased resistance of 30 ohms by heating during operation. The remarkable harmonics suppression by use of the lamp was observed at a low current flowing through and a low consumption of power by the lamp when a filament of the lamp slightly lights red.

Figure 2:
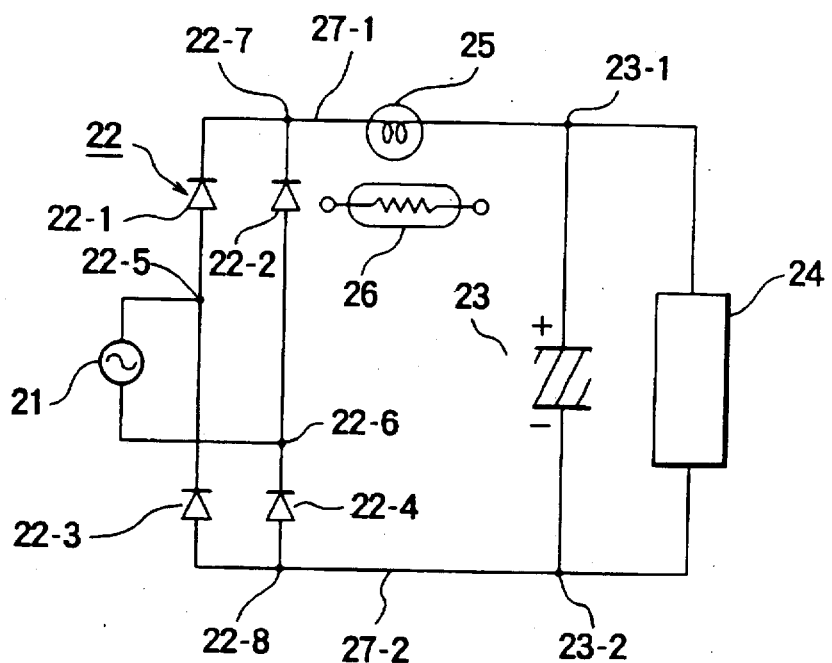
FIG. 2 is a circuit diagram of a power circuit according to an embodiment of the present invention.

Referring to FIG. 2, in a power circuit according to an embodiment of the present invention, an AC commercial power source 21 of 100V supplies its output current to a bridge type rectifying circuit 22. The rectifying circuit 22 comprises four rectifiers 22-1, 22-2, 22-3 and 22-4 such as semiconductor diodes connected to each other to form a well known bridge circuit. The bridge type rectifying circuit 22 has input terminals 22-5 and 22-6 across which the AC power source 21 is connected. The bridge type rectifying circuit 22 has a positive output terminal 22-7 and a negative output terminal 22-8. The rectifying circuit 22 rectifies the output voltage of the AC power source 21 to produce a rectified output which is a pulsating current.

The rectified output is smoothed into a smoothed output as a DC output by a smoothing circuit 23, and the DC output is applied to a load 24.

The smoothing circuit 23 comprises a smoothing electrolytic capacitor, which is represented by the same reference numeral of 23. The electrolytic capacitor 23 has polarity and therefore, has an anode electrode 23-1 and a cathode electrode 23-2. The anode and cathode electrodes 23-1 and 23-2 are connected to the positive output terminal 22-7 and the negative output terminal 22-8 through positive side and negative side connection lines 27-1 and 27-2, respectively.

The positive side connection line 27-1 has the tungsten lamp 25 connected in series therewith. The lamp 25 is an inert-gas containing bulb type. Alternatively, a vacuum bulb type lamp can be used.

Figure 4:
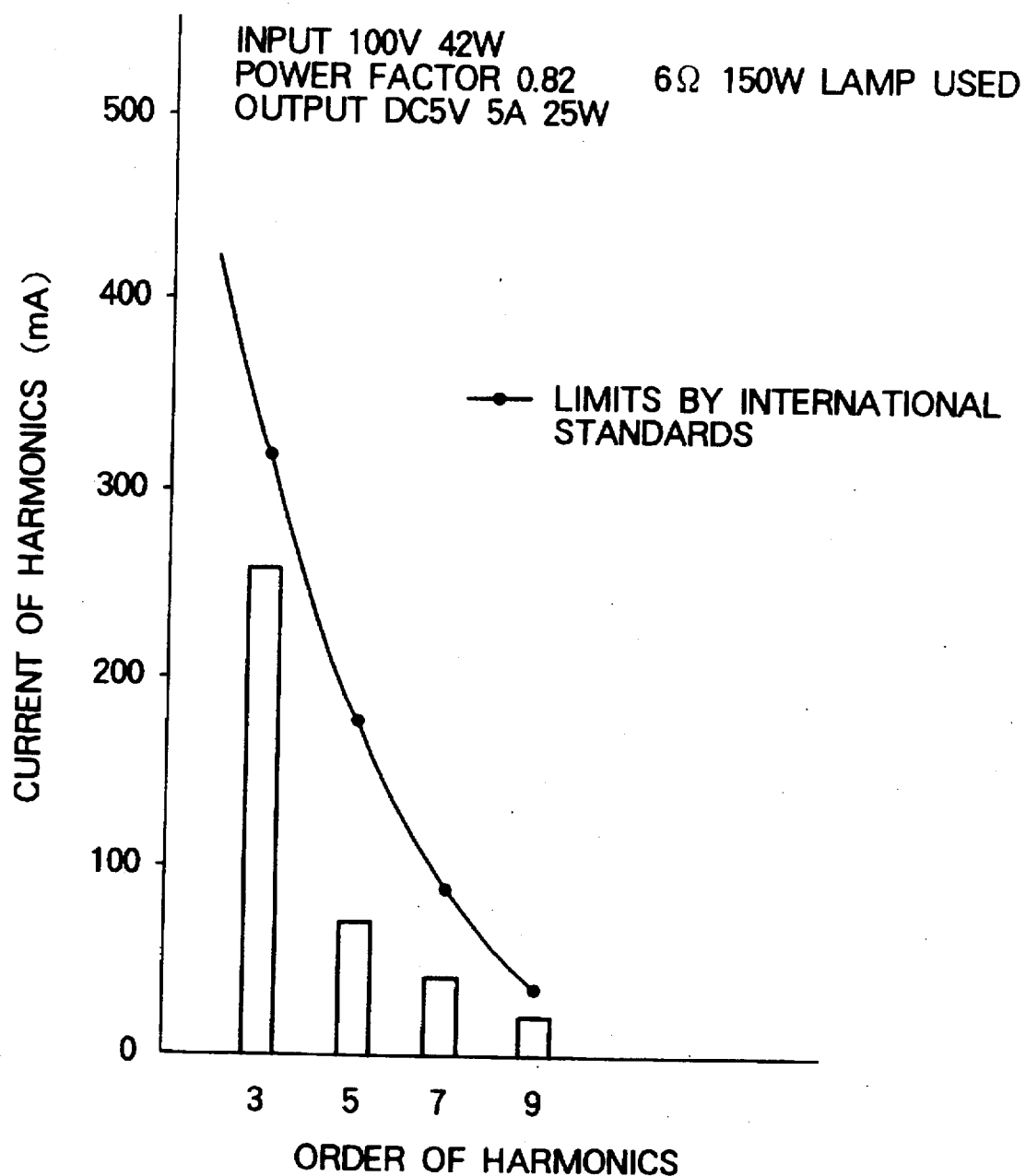
FIG. 4 is a graph showing harmonics generated in the power circuit of FIG. 2 where a tungsten lamp is used as the resistor having a positive temperature coefficient of resistance.

As the load 24, a DC/DC converter as a switching power supply is used of a similar type as described in connection with FIG. 1. The current of harmonics of odd number orders was measured in the similar manner as described in FIG. 3, but under the input condition of 42W/100V. The measured data are shown in FIG. 4. It is seen that the measured current of harmonics such as 150Hz, 250Hz, 350Hz and so on is greatly reduced below the limits (which are shown by a curved line) prescribed by the International Standards. The power factor was also confirmed to be 0.82 which exceeds 0.7.

Figure 5:
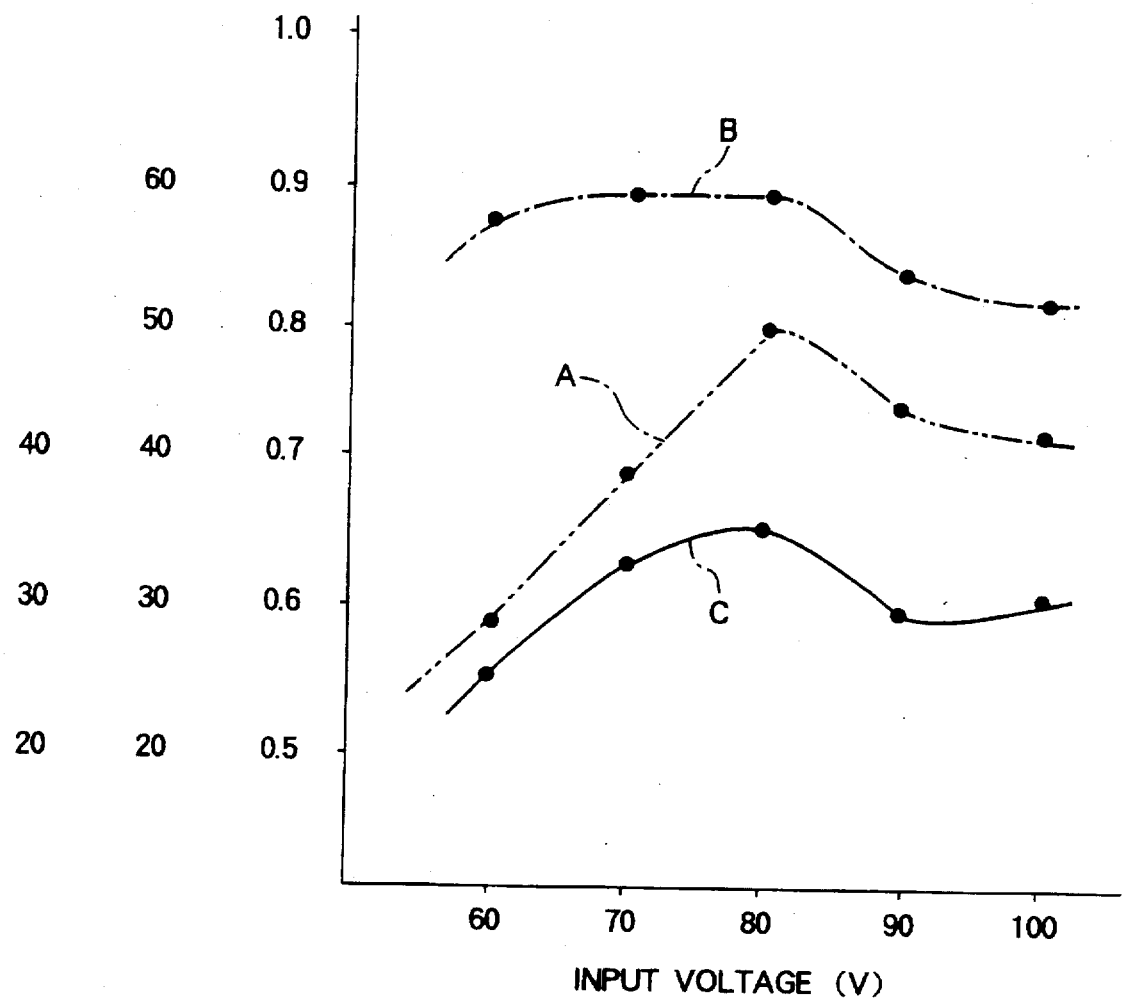
FIG. 5 is a graph showing a relation of a power factor, an input power, and a resistance to an input voltage in the power circuit of FIG. 2 using the tungsten lamp as the resistor having a positive temperature coefficient of resistance.

FIG. 5 shows variations of the input power and the power factor of the power circuit of FIG. 2 and of the resistance of the lamp 25 in response to variation of the input voltage supplied from the AC power source. In the figure, curves A, B and C represent the variations of the input power, the power factor and the resistance of the lamp, respectively. It will be understood from FIG. 5, that the power factor becomes rather high when the input voltage is low. The variation of the input power is not abnormal but is adequate, and the resistance of the lamp changes over a range between the normal resistance and the five or six times of the normal resistance.

It was also confirmed that the power consumption by the lamp was 3.6W under the full loaded condition of the power circuit. The power consumption is about $\frac{1}{41}$ of 150W which is the normal power consumption of the lamp. This means that the temperature elevation is not so large to thereby prolong the life of the lamp. Therefore, it will be noted that the lamp can be made by use of a smaller bulb so that the resultant lamp can conveniently be used in an equipment containing the power circuit.

It will be easy to select a lamp which is adaptable to the power circuit for another AC power source of, for example, 200V.

The tungsten lamp is a non-linear resistor element having a positive temperature coefficient (PTC) of resistance. Therefore, it is expected that other elements such as PTC thermistors having the similar nonlinear positive temperature coefficient of resistance can also be used in place of the tungsten lamps so as to suppress the harmonics in the power circuit.

Referring to FIG. 2, a non-connected PTC thermistor 26 is shown having a positive temperature coefficient of resistance and which is adapted connected in the circuit in place of the tungsten lamp 5. The PTC thermistor 26 by way of illustration has an initial resistance of 7 ohms and the maximum current of 4.0A.

In the power circuit using the PTC thermistor 26, the current of harmonics, the power factor, the input power, resistance of the thermistor were measured in the similar manner as in use of the lamp but an input condition of 36W/100V. The power factor was 0.73 which was improved in comparison with that in FIG. 1. The measured result is shown in FIGS. 6 and 7 which are similar to FIGS. 4 and 5.

Figure 6:
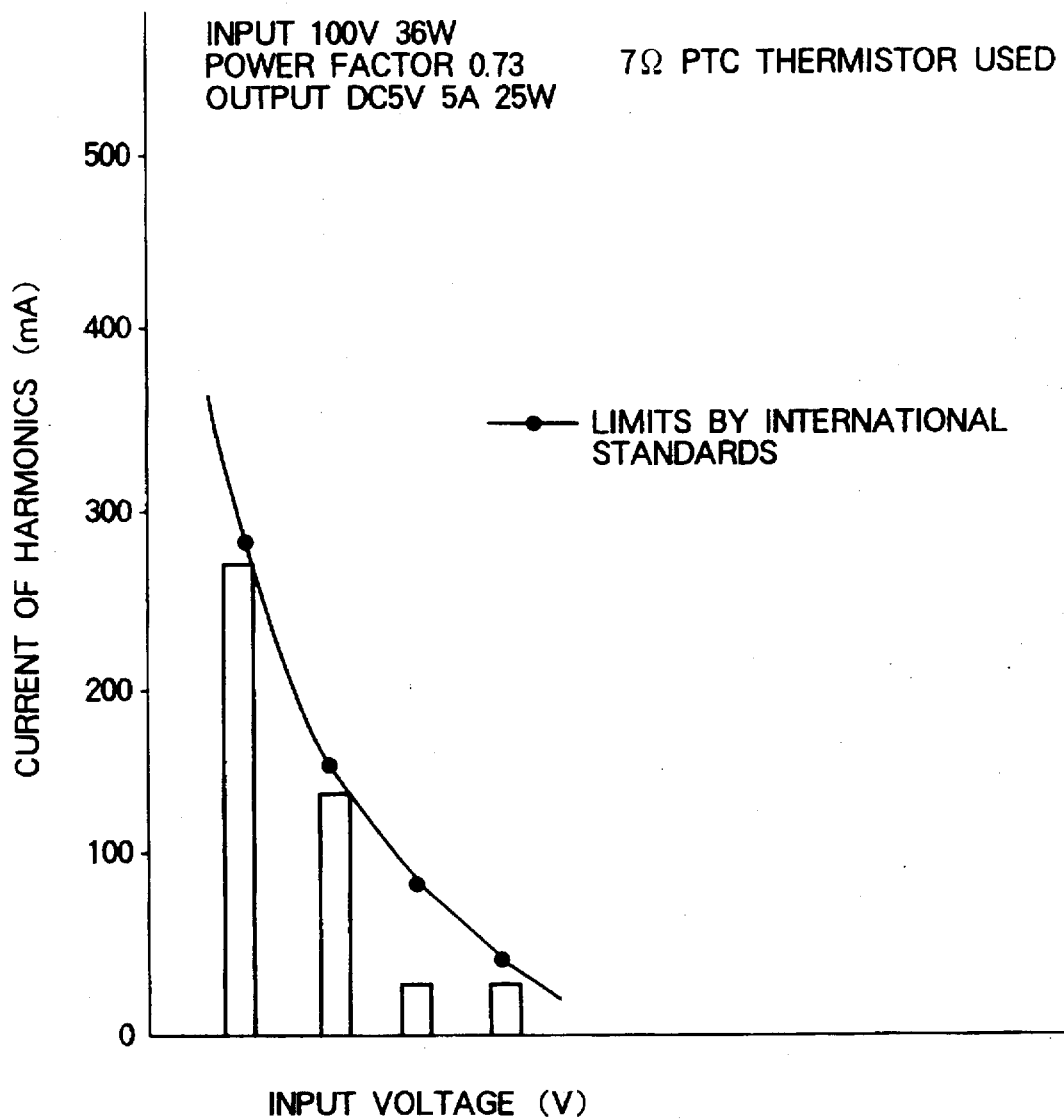
FIG. 6 is a graph showing harmonics generated in the power circuit of FIG. 2 where a PTC thermistor is used as the resistor having a positive temperature coefficient (PTC) of resistance.
Figure 7:
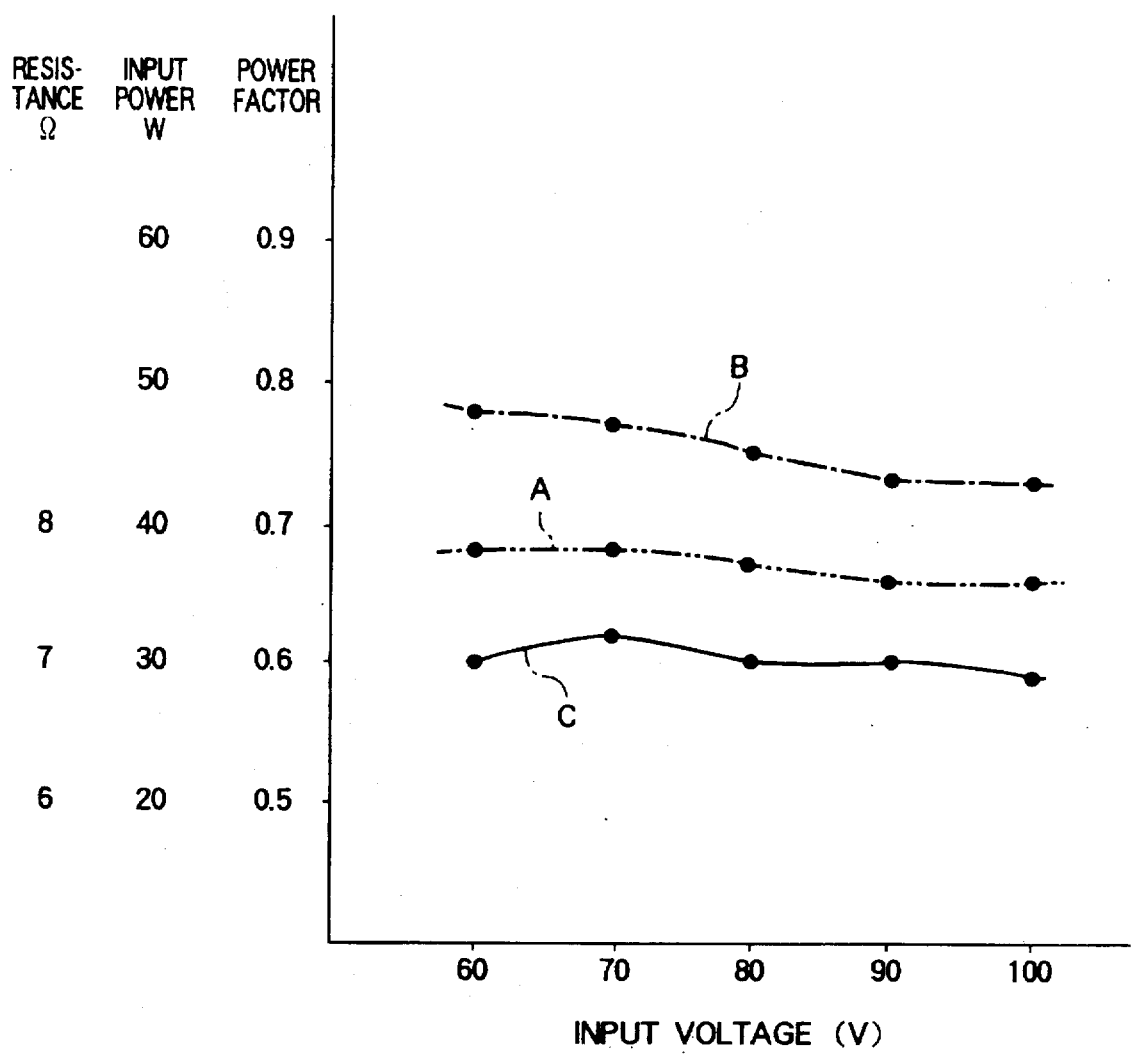
FIG. 7 is a graph showing a relation of a power factor, an input power, and a resistance to an input voltage in the power circuit of FIG. 2 using the PTC thermistor as the resistor.

It is understood from FIG. 6 that the current of the harmonics are lower than the limits (shown by a curved line) by the International Standards. Further, it is noted in FIG. 7 that the power factor, the input power, and the resistance of the thermistor are stable or do not almost change for variation of the input voltage. The temperature elevation of the thermistor is very small so that the stable operation is expected for a long time.

Although the above-mentioned embodiments have been described as to use of a particular tungsten lamp and a combination of particular thermistor elements in the power circuit for the AC power source of 100V, it should be noted that other various lamps having a positive temperature coefficient of resistance and various PTC thermistors can be used to suppress generation of the harmonics in the power circuit for various AC power sources such as 100V, 200V and others.

What is claimed is:

1. An electric power circuit for producing a DC output from an AC output of an AC power source, comprising rectifying means connectable to said AC power source for rectifying said AC output to produce a rectified output, smoothing means comprising an electrolytic capacitor connected to said rectifying means and having an output port connectable to a load for smoothing said rectified output to produce a smoothed output as said DC output onto said output port, said DC output being supplied to said load connected to said output port so that a load current flows from said power circuit through said load, wherein said rectifying means and said electrolytic capacitor are connected through a non-linear resistance element having a positive temperature coefficient of resistance, said non-linear resistance element being always connected and shunted during operation of the power circuit.

2. A power circuit as claimed in claim 1, wherein said rectifying means has a positive terminal and a negative terminal, said electrolytic capacitor being connected across said positive terminal and said negative terminal through a positive connection line and a negative connection line, respectively, and said positive connection line has said non-linear resistance element connected in series therein.

3. A power circuit as claimed in claim 2, wherein said non-linear resistance element is a tungsten lamp.

4. A power circuit as claimed in claim 3, wherein said tungsten lamp comprises a vacuum bulb.

5. A power circuit as claimed in claim 3, wherein said tungsten lamp comprises an inert-gas containing bulb.

6. A power circuit as claimed in claim 2, wherein said non-linear resistance element is a thermistor having a positive temperature coefficient of resistance.

* * * * *